US005703172A

United States Patent [19]
Watanabe et al.

[11] Patent Number: 5,703,172
[45] Date of Patent: Dec. 30, 1997

[54] PROPYLENE BLOCK COPOLYMER AND PROCESS FOR PRODUCING THE SAME

[75] Inventors: Kazuyuki Watanabe; Hisayoshi Yanagihara; Shimako Matsumoto, all of Oita, Japan

[73] Assignee: Showa Denko K.K., Tokyo, Japan

[21] Appl. No.: 558,872

[22] Filed: Nov. 16, 1995

[30] Foreign Application Priority Data

Nov. 21, 1994 [JP] Japan .................. 6-311241
Nov. 21, 1994 [JP] Japan .................. 6-311242

[51] Int. Cl.$^6$ .................................. C08F 10/06
[52] U.S. Cl. .................. 525/323; 525/232; 526/126
[58] Field of Search .................. 525/323, 232; 526/126

[56] References Cited

U.S. PATENT DOCUMENTS

| | | | |
|---|---|---|---|
| 4,990,476 | 2/1991 | Ishimaru | 502/125 |
| 5,130,248 | 7/1992 | Terano | 502/125 |
| 5,244,989 | 9/1993 | Hara | 526/119 |
| 5,247,031 | 9/1993 | Kioka | 526/125 |
| 5,247,032 | 9/1993 | Kioka | 526/128 |
| 5,438,110 | 8/1995 | Ishimaru | 526/125 |
| 5,453,466 | 9/1995 | Pallegatti | 525/240 |
| 5,476,903 | 12/1995 | Shinozaki et al. | 525/232 |
| 5,478,890 | 12/1995 | Shinozaki et al. | 525/240 |
| 5,489,634 | 2/1996 | Hara | 526/119 |

FOREIGN PATENT DOCUMENTS

| | | |
|---|---|---|
| 0226003 | 6/1987 | European Pat. Off. . |
| 0376081 | 7/1990 | European Pat. Off. . |
| 0400333 | 12/1990 | European Pat. Off. . |
| 0515879 | 12/1992 | European Pat. Off. . |
| 0534776 | 3/1993 | European Pat. Off. . |
| 2340961 | 1/1977 | France . |

*Primary Examiner*—Irina S. Zemel
*Attorney, Agent, or Firm*—Sughrue, Mion, Zinn, Macpeak & Seas

[57] ABSTRACT

A propylene block copolymer comprising a matrix phase and a dispersed phase dispersed in said matrix phase, said matrix phase comprising (a) polypropylene; said dispersed phase having an average particle diameter of from 0.1 to 5 µm; and said dispersed phase comprising an outer layer comprising (b) propylene-α-olefin copolymer rubber and an inner layer comprising (c) crystalline polyethylene dispersed therein a plurality of particles comprising an outer layer comprising (b') propylene-α-olefin copolymer rubber and an inner layer comprising (a') polypropylene, a propylene block copolymer comprising a matrix phase and a dispersed phase dispersed in said matrix phase, said matrix phase comprising (a) polypropylene; said dispersed phase having an average particle diameter of from 0.1 to 5 µm; and said dispersed phase comprising (b) propylene-α-olefin copolymer rubber having therein at least one particle comprising (a') polypropylene and at least one particle comprising (c) crystalline polyethylene. Propylene block copolymer resin compositions comprising the propylene block copolymers, and processes for producing a propylene block copolymers.

5 Claims, 4 Drawing Sheets

PROPYLENE BLOCK COPOLYMER AND PROCESS FOR PRODUCING THE SAME

FIELD OF THE INVENTION

The present invention relates to a propylene block copolymer which is especially suitable for use in the fields of machine parts, electrical or electronic parts, and packaging materials and as an engineering plastic substitute, etc., and which is excellent in balance between rigidity and impact resistance and in heat resistance and surface hardness. The present invention also relates to a process for producing the copolymer.

BACKGROUND OF THE INVENTION

Propylene block copolymers are extensively used as a propylene resin having improved impact resistance in the fields of automobiles and domestic electrical appliances. The copolymers are usually produced by a multistep polymerization process comprising a first step of polymerizing propylene and a second step of copolymerizing propylene and an α-olefin. Ethylene is extensively used as the α-olefin.

To improve both rigidity and impact resistance, a process has been proposed which comprises the two steps described above and a third step of polymerizing ethylene (as described, e.g., in JP-A-50-142652, JP-A-52-98045, JP-A-53-88049, and JP-A-55-66939). (The term "JP-A" as used herein means an "unexamined published Japanese patent application.")

However, the processes described above each has a problem that the copolymer obtained not only is insufficient in balance between rigidity and impact resistance but also has significantly reduced heat resistance due to the incorporation of a polyethylene component. The present invention has been achieved under the circumstances described above.

SUMMARY OF THE INVENTION

An object of the present invention is to provide a propylene block copolymer having an excellent balance between rigidity and impact resistance and excellent in heat resistance and surface hardness.

Another object of the present invention is to provide a resin composition containing the copolymer Further object of the present invention is to provide a process for producing the copolymer.

Other objects and effects of the present invention will be apparent from the following description.

As a result of intensive studies made by the present inventors, it has been found that the above objects can be accomplished with a propylene block copolymer containing dispersed particles having a specific structure. The present invention has been completed based on this finding.

The present invention relates to, as a first aspect, a propylene block copolymer having a core/shell-multidomain composite structure. The propylene block copolymer of the first aspect of the present invention comprises a matrix phase and a dispersed phase dispersed in said matrix phase, said matrix phase comprising (a) polypropylene;

said dispersed phase having an average particle diameter of from 0.1 to 5 μm; and said dispersed phase comprising an outer layer comprising (b) propylene-α-olefin copolymer rubber and an inner layer comprising (c) crystalline polyethylene dispersed therein a plurality of particles comprising an outer layer comprising (b') propylene-α-olefin copolymer rubber and an inner layer comprising (a') polypropylene.

The propylene block copolymer according to the first aspect of the present invention can be produced by a process which comprises a first polymerization step of polymerizing ethylene, a second polymerization step of polymerizing propylene, and a third polymerization step of polymerizing propylene and an α-olefin, said first, second, and third polymerization steps being conducted in the presence of a modified polymerization catalyst obtained by the steps of:

treating a solid catalyst comprising a magnesium compound, a titanium compound, a halogen-containing compound, and an electron-donating compound, with a titanium compound represented by formula $TiX_a \cdot Y_b$, wherein X represents Cl, Br, or I; Y represents an electron-donating compound; a represents an integer of 3 or 4; and b represents an integer of 3 or less, and washing said solid catalyst with a halogen-containing compound and then with a hydrocarbon.

The present invention also relates to, as a second aspect, a propylene block copolymer having a multidomain structure. The propylene block copolymer according to the second aspect of the present invention comprises a matrix phase and a dispersed phase dispersed in said matrix phase, said matrix phase comprising (a) polypropylene;

said dispersed phase having an average particle diameter of from 0.1 to 5 μm; and said dispersed phase comprising (b) propylene-α-olefin copolymer rubber having therein at least one particle comprising (a') polypropylene and at least one particle comprising (c) crystalline polyethylene.

The propylene block copolymer according to the second aspect of the present invention can be produced by a process which comprises a first polymerization step of polymerizing propylene, a second polymerization step of polymerizing propylene and an α-olefin, and a third polymerization step of polymerizing ethylene, said first, second, and third polymerization steps being conducted in the presence of a modified polymerization catalyst obtained by the steps of:

treating a solid catalyst comprising a magnesium compound, a titanium compound, a halogen-containing compound, and an electron-donating compound, with a titanium compound represented by formula $TiX_a \cdot Y_b$, wherein X represents Cl, Br, or I; Y represents an electron-donating compound; a represents an integer of 3 or 4; and b represents an integer of 3 or less, and washing said solid catalyst with a halogen-containing compound and then with a hydrocarbon.

The present invention further relates to a propylene block copolymer resin composition comprising the propylene block copolymer according to the first or second aspect of the present invention and a nucleating agent in an amount of from 0.05 to 30% by weight based on the amount of the propylene block copolymer.

DETAILED DESCRIPTION OF THE INVENTION

The propylene block copolymer (hereinafter referred to as "BPP") of the present invention comprises a matrix phase comprising polypropylene (a) and a dispersed phase comprising particles of a propylene-α-olefin copolymer rubber (b), which particles mainly have a core/shell-multidomain composite structure (in the first aspect of the invention) or a multidomain structure (in the second aspect of the invention).

Figure 1:
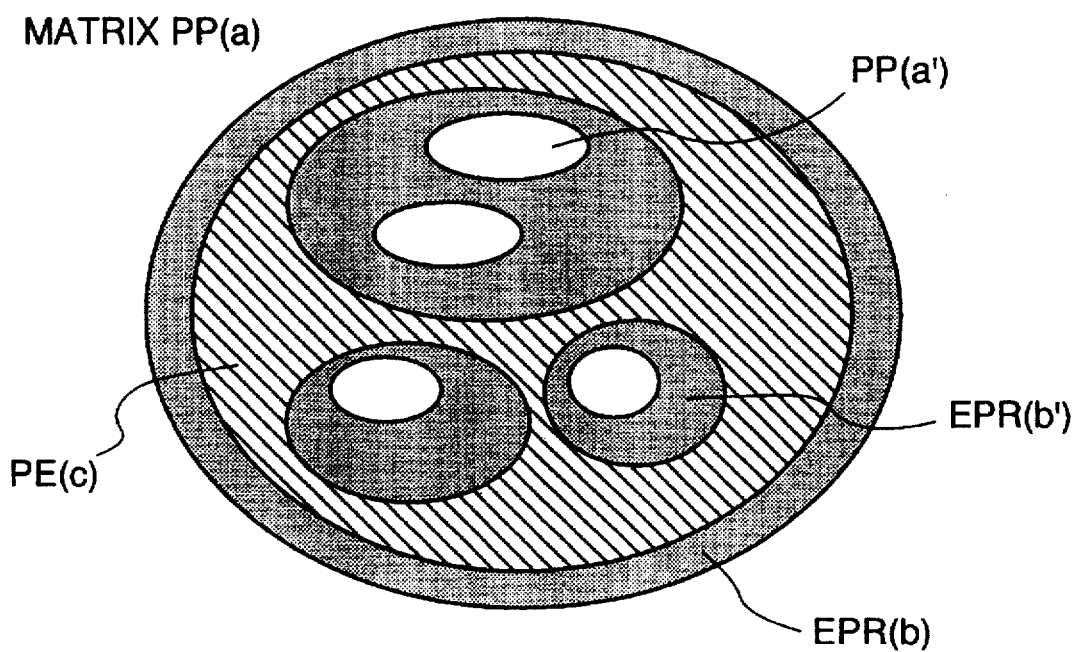
FIG. 1 is a diagrammatic view of the core/shell-multidomain composite structure of a dispersed particle in a propylene-ethylene block copolymer according to the first aspect of the present invention.

The core/shell-multidomain composite structure is explained below by reference to drawings. FIG. 1 is a view diagrammatically showing the structure of a dispersed particle in a propylene-ethylene block copolymer according to the first aspect of the present invention. In FIG. 1, the particle comprises an outer layer comprising an ethylene-propylene copolymer rubber (EPR(b)) and an inner layer comprising crystalline polyethylene (PE(c)). This structure is generally called a core/shell structure. It should however be noted that in this BPP of the first aspect of the present invention, the inner layer contains a plurality of particles each comprising an outer layer comprising an ethylene-propylene copolymer rubber (EPR(b')) and an inner layer comprising polypropylene (PP(a')). This structure is called a multidomain structure.

The structure of the dispersed particles in the BPP according to the first aspect of the present invention is a combination of the core/shell structure and the multidomain structure.

Figure 2:
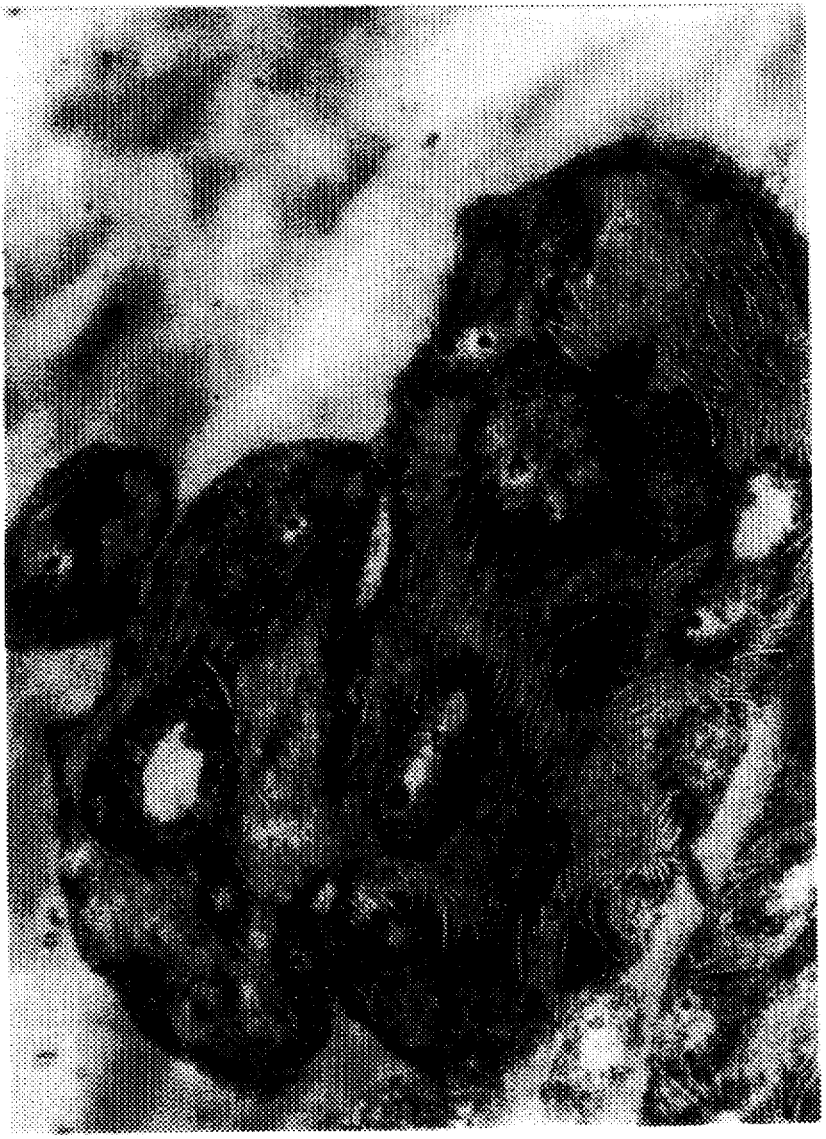
FIG. 2 is a view showing an example of a transmission electron microscope (TEM) photograph (magnification, 33,000 diameters) of a BPP according to the first aspect of the present invention.

In FIG. 2 is shown an example of a transmission electron microscope (TEM) photograph (magnification: 33,000) of a BPP according to the first aspect of the present invention. In FIG. 2, the black part constituting the outermost layer of each particle comprises EPR(b), and the white fibrous part just inside the black part comprises lamellar crystals of PE(c). The black parts surrounded by the PE(c) comprise EPR(b'), and the white part surrounded by each EPR(b') part comprises PP(a').

Figure 3:
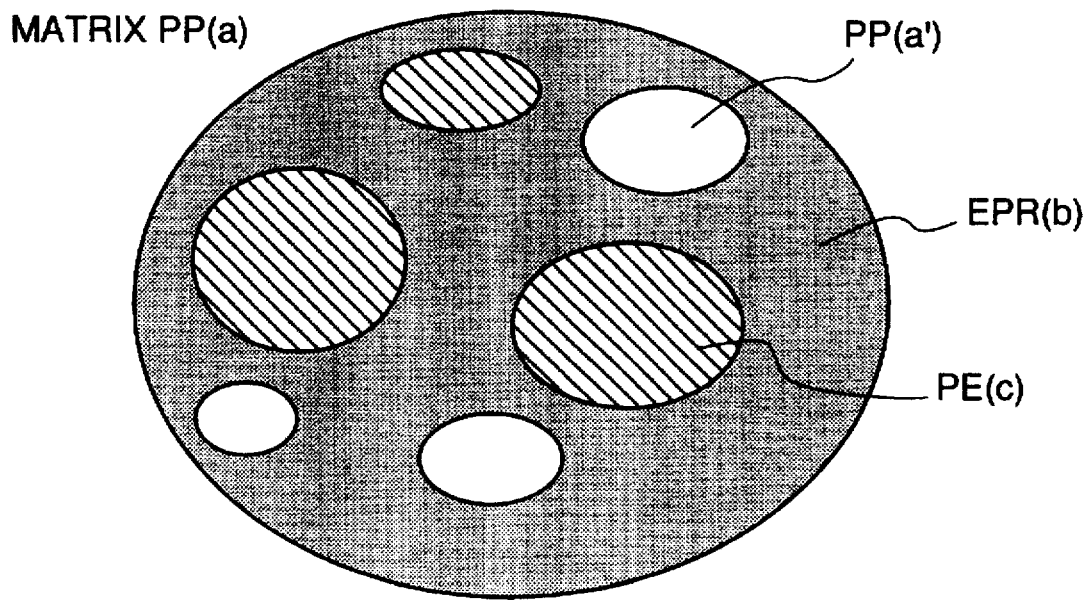
FIG. 3 is a diagrammatic view of the multidomain structure of a dispersed particle in a propylene-ethylene block copolymer according to the second aspect of the present invention.

FIG. 3 is a view diagrammatically showing the multidomain structure of a dispersed particle in a propylene-ethylene block copolymer according to the second aspect of the present invention. In FIG. 3, a particle comprising an ethylene-propylene copolymer rubber (EPR(b)) is present in the matrix phase comprising polypropylene (matrix PP(a)), and the particle of EPR(b) contains particles of polypropylene (PP(a')) and particles of crystalline polyethylene (PE (c)). This structure is generally called a multidomain structure.

Figure 4:
FIG. 4 is a view showing an example of a transmission electron microscope (TEM) photograph (magnification, 33,000 diameters) of a BPP according to the second aspect of the present invention.

In FIG. 4 is shown an example of a transmission electron microscope (TEM) photograph (magnification: 33,000) of a BPP according to the second aspect of the present invention. In FIG. 4, the white part surrounding the particle comprises a polypropylene matrix phase (matrix PP(a)), and the black part constituting the outermost part of the particle comprises EPR(b). The white circular particles surrounded by the EPR(b) comprise polypropylene (PP(a')), and the white fibrous particles also surrounded by the EPR(b) comprise lamellar crystals of crystalline polyethylene (PE(c)).

In the first and second aspects of the present invention, the average particle diameter of the dispersed particles is generally from 0.1 to 5 μm, preferably from 0.15 to 4.5 μm, particularly preferably from 0.2 to 4 μm. If the average particle diameter thereof is smaller than 0.1 μm, rigidity tends to decrease. Average particle diameters thereof exceeding 5 μm are not preferred in that impact resistance tends to be impaired.

Due to the special particle structures described above, the BPP of the present invention has a strengthened EPR part, so as to enable the BPP to have not only an excellent balance between rigidity and impact resistance but also excellent heat resistance.

The BPP of the present invention having the specific particle structure can be obtained with a copolymer comprising (A) from 30 to 94.9% by weight of polypropylene part, (B) from 5 to 50% by weight of propylene-α-olefin copolymer rubber part having an α-olefin content of 20 to 80% by weight, and (C) from 0.1 to 20% by weight of polyethylene part having a density of 0.92 g/cm$^3$ or higher (provided that (A)+(B)+(C)=100% by weight).

Polypropylene part (A) may be either a homopolymer of propylene or a copolymer of propylene and an α-olefin having 2 to 12, excluding 3, carbon atoms (the copolymer has an α-olefin content up to 20% by weight). The preferred range of the proportion of polypropylene part (A) is from 35 to 92.8% by weight. Propylene-α-olefin copolymer rubber part (B) may be a copolymer of propylene and an α-olefin. Examples of the α-olefin include ethylene and olefins having 4 to 12 carbon atoms, such as 1-butene, 3-methyl-1-butene, 3-methyl-1-pentene, 4-methyl-1-pentene, 4,4-dimethyl-1-pentene, vinylcyclopentane, and vinylcyclohexene. Preferred of these are ethylene and 1-butene. Copolymer rubber part (B) preferably has an α-olefin content of 25 to 75% by weight, and the proportion of the copolymer rubber part is preferably from 7 to 45% by weight. Polyethylene part (C) may be an ethylene homopolymer having a density of 0.92 g/cm$^3$ or higher, and the proportion thereof is preferably from 0.2 to 15% by weight.

In the first aspect of the present invention, polypropylene part (A) is formed in the second-step reaction, propylene-α-olefin copolymer rubber part (B) is formed in the third-step reaction, and polyethylene part (C) is formed in the first-step reaction.

In the second aspect of the present invention, polypropylene part (A) is formed in the first-step reaction, propylene-α-olefin copolymer rubber part (B) is formed in the second-step reaction, and polyethylene part (C) is formed in the third-step reaction.

In the BPP of the present invention, polypropylene (a) constituting the matrix phase preferably has the following properties.

(i) The insoluble amount on xylene extraction at 25° C. (hereinafter referred to as "XI") is 99.0% by weight or more, preferably 99.7% by weight or more.

The XI was measured by a method comprising dissolving the polypropylene in 135° C. o-xylene and then cooling the solution to 25° C. to precipitate a polymer.

(ii) The isotactic pentad fraction (hereinafter referred to as "IP") is 98.0% or more, preferably 99.0% or more.

IP is the content of isotactic pentads in all pentads contained in a polypropylene molecular chain. The IP used herein is determined by means of nuclear magnetic resonance using an isotope carbon ($^{13}C$ NMR) according to the method described in A. Zambelli, *Macromolecules*, vol. 6, p. 925 (1973), ibid, vol. 8, p. 687 (1975), and ibid, vol. 13, p. 267 (1980).

(iii) The isotactic average chain length (hereinafter referred to as "N") is 500 or more, preferably 800 or more.

N used herein means the average length of parts each having methyl groups bonded in an isotactic manner in polypropylene molecules. The measurement of N was made according to the method described in J. C. Randall, *Polymer Sequence Distribution*, Chapter 2, Academic Press, New York (1977).

Figure 5:
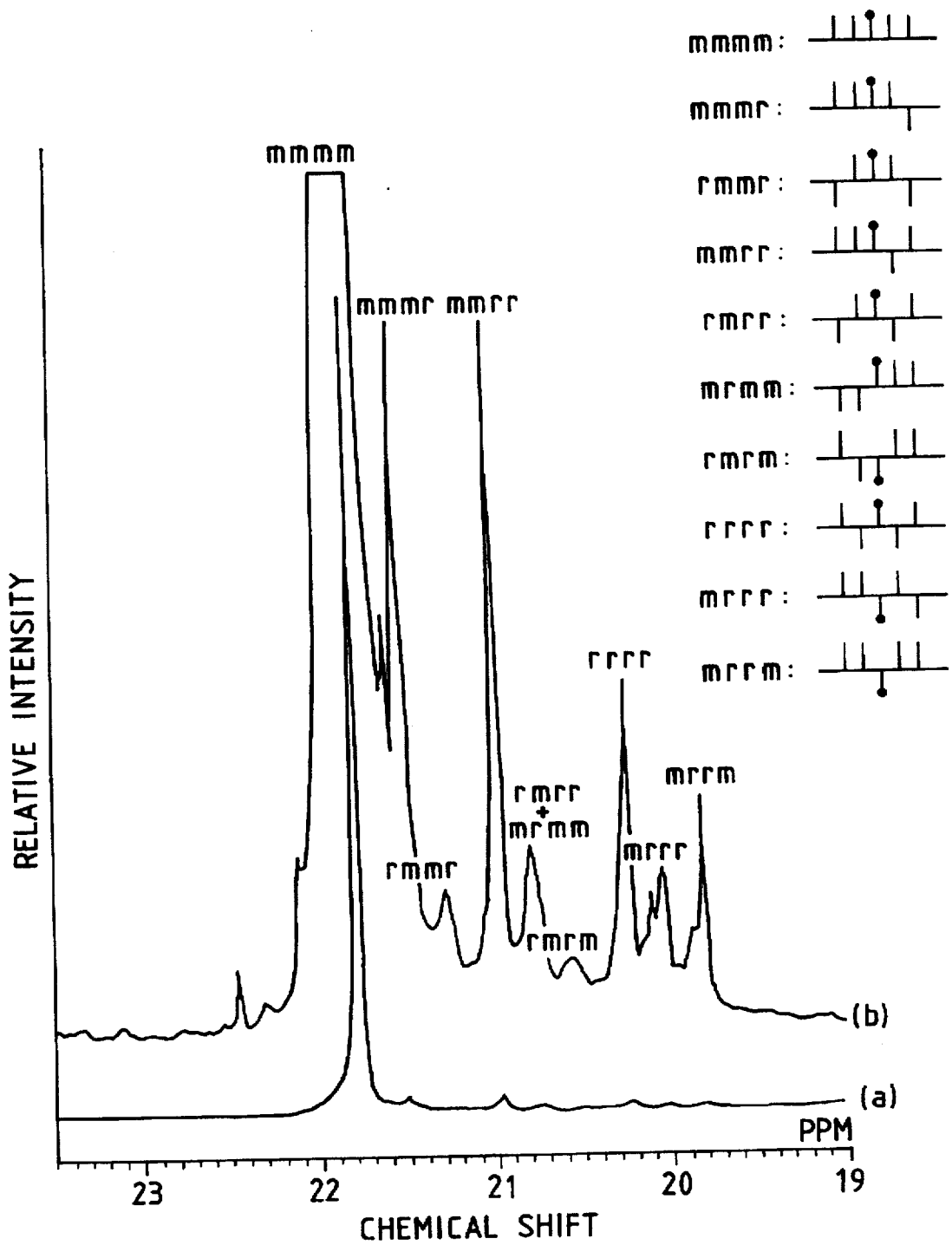
FIG. 5 shows an example of the carbon-13 nuclear magnetic resonance ($^{13}C$ NMR) spectrum of polypropylene in a methyl region thereof.

In this method, a polypropylene is added to a 1,2,4-trichlorobenzene/deuterated benzene mixed solvent in such an amount as to result in a polymer concentration of 10% by weight, and this mixture is heated to 130° C. to dissolve the polymer. This solution is placed into a test tube having a diameter of 10 mm made of glass, and analyzed by $^{13}C$ NMR spectrometry in the same manner as for IP. An example of the thus-obtained spectrum is shown in FIG. 5, wherein a is a spectrum for a methyl group region in the polypropylene and b is an amplification of the spectrum. In this spectrometry, each pentad, which is a set of five successive methyl groups, is analyzed as one unit; the pentads give different absorption peaks according to differences in the isotacticity of methyl groups (there are ten kinds of structures including "mmmm", "mmmr", etc.). Absorption peak assignment to these isotacticities is shown in FIG. 5, b.

There is a polymerization theory called a two-site model and described in Shan-Nong Zhu et al., *Polymer Journal*, vol. 15, No. 12, p. 859–868 (1983). According to this theory, the polymer which is being produced by polymerization has two kinds of active sites, one of which is present on the catalyst side and the other of which is at the polymer terminal. The polymerization which proceeds on the catalyst side is called catalyst-governed polymerization, while the polymerization proceeding on the other side is called terminal-governed polymerization. (Details are given in Junji Furukawa, *Kobunshi No Essensu To Topikkusu 2* (Essence and Topics of Polymers 2), Kobunshi Gosei (Polymer Syntheses), p. 73, published by Kagaku Dojin K. K. (1986).)

According to the reference cited above, the two-site model can be utilized to theoretically calculate the isotactic intensities of the ten pentads having different isotacticities using the following:

α: the probability of the addition of a D isomer unit and an L isomer unit to the active terminal where catalyst-governed polymerization (enantiomorphic process) proceeds, i.e., an index to the degree of disorder in the isotactic segments;

σ: the probability of the formation of a meso-form part through the addition of a unit to an active terminal having the same unit by means of terminal-governed polymerization (Bernoulli process); and ω: the proportion of α sites.

The values of α, σ, and ω are determined by the least square method so that the theoretical intensities calculated by the method described above coincide with the intensities measured by the $^{13}C$ NMR spectrometry described above.

From these values, the individual pentads are determined using the equations shown in Table 1 below.

TABLE 1

| Meso-form segments | |
|---|---|
| $A_1$ | mmmm = ω (1 − 5 β + 5 β²) + (1 − ω) σ⁴ |
| $A_2$ | mmmr = ω (2 β − 6 β²) + 2 (1 − ω) σ³ (1 − σ) |
| $A_3$ | rmmr = ω β² + (1 − ω) σ² (1 − σ)² |
| Racemic structure | |
| $A_4$ | mmrr = ω (2 β − 6 β²) + 2 (1 − ω) σ² (1 − σ)² |
| $A_5$ | mmrm = 2 ω β² + 2 (1 − ω) σ³ (1 − σ) |
| $A_6$ | rmrr = 2 ω β² + 2 (1 − ω) σ (1 − σ)³ |
| $A_7$ | rmrm = 2 ω β² + 2 (1 − ω) σ² (1 − σ)² |
| $A_8$ | rrrr = ω β² + 2 (1 − ω) (1 − σ)⁴ |
| $A_9$ | mrrr = ω β² + 2 (1 − ω) σ (1 − σ)³ |
| $A_{10}$ | mrrm = ω (β − 3 β²) + (1 − ω) σ² (1 − σ)² | wherein β=α(1−α)

The average isotactic-chain length (N) may be determined using the following equation described in the above-cited reference by J. C. Randall.

$$N = \frac{\text{number of meso-form segments}}{\text{number of meso-form units}}$$

However, the value of N can be virtually determined using the following equation.

$$N = 1 + (A_1 + A_2 + A_3)/0.5(A_4 + A_5 + A_6 + A_7)$$

(iv) The total amount of fractions obtained by column chromatographic separation that have an isotactic average chain length (hereinafter referred to as "$N_f$") of 800 or more obtained in a column chromatographic separation should be 10% by weight or more based on the total amount of all fractions, and it is preferably 30% by weight or more.

The column chromatographic separation used herein is a method which comprises dissolving the xylene insoluble content in p-xylene at a temperature of 130° C., adding a Celite thereto, cooling the mixture to 30° C. at a rate of 10° C./hr to allow the polymer to deposit on the Celite, packing a slurry of the Celite into a column, and passing p-xylene as a developer through the column while increasing the temperature of the developer step-wise by 2.5° C. from 30° C. to separate the polypropylene into fractions. Details of this method are given in Masahiro Kakugo et al., *Macromolecules*, vol. 21, p. 314–319 (1988). $N_f$ of the polypropylene fractions is determined using the above-described method for measuring N.

The mechanism of the formation of the special particle structure in the present invention is not clear. However, it is considered that the use of the polymerization catalyst described later which forms a highly stereospecific polymer contributes the formation of the special structure. It is further considered that, in the first embodiment of the present invention, the order of polymerization, which is different from that of the ordinary polyolefin, also contributes the formation of the special structure.

The melt flow rate (MFR, according to JIS K7210, Table 1, Condition 14) of the BPP according to the present invention can be selected depending on the molding method and the usage thereof, and is generally from 0.1 to 500 g/10 min, preferably from 0.1 to 450 g/10 min, and more preferably from 0.1 to 400 g/10 min. For example, the MFR is generally from 1.0 to 150 g/10 min for injection molding, from 0.1 to 10 g/10 min for inflation film molding, from 1.0 to 20 g/10 min for cast molding, and from 0.1 to 10 g/10 min for hollow molding.

The BPP according to the first aspect of the present invention can be produced by a process comprising a first-step reaction for polymerizing ethylene, a second-step reaction for polymerizing propylene, and a third-step reaction for copolymerizing propylene and an α-olefin. The BPP according to the second aspect of the present invention can be produced by a process comprising a first-step reaction for polymerizing propylene, a second-step reaction for copolymerizing propylene and an α-olefin, and a third-step reaction for polymerizing ethylene.

The BPP of the present invention can be obtained by the multi-stage polymerization process described above. Examples of the polymerization method include a solution polymerization method, such as slurry polymerization and bulk polymerization, as well as a gas-phase polymerization method using no solvent. In the case of a slurry polymerization method, examples of a solvent used include inert hydrocarbons, such as hexane, heptane, cyclohexane, and toluene; and liquid α-olefin such as propylene.

The polymerization can be conducted in the presence of the modified polymerization catalyst described later, an organoaluminum compound, and organosilicon compound. The concentration of the modified polymerization catalyst upon polymerization is generally about from 0.001 to 50 mmol, preferably about from 0.01 to 10 mmol, in terms of titanium atom contained in the modified polymerization catalyst, per 1 litter of the solvent. The amount of the organoaluminum compound is generally about from 1 to 2,000 mol, preferably about from 2 to 500 mol, per mole of titanium atom contained in the modified polymerization catalyst. The amount of organosilicon compound is generally about from 0.001 to 10 mol, preferably about from 0.01 to 5 mol, per mole of titanium atom contained in the modified polymerization catalyst. The polymerization temperature is generally from −50 to 200° C., preferably from 20° to 150° C. The polymerization pressure is generally from atmospheric pressure to 100 kg/cm², preferably from 2 to 50 kg/cm². The molecular weight of the resulting polymer can be controlled by introducing hydrogen in an appropriate amount into the polymerization system.

Examples of the organoaluminum compound include a trialkyl aluminum such as trimethyl aluminum, triethyl aluminum, tripropyl aluminum, tributyl aluminum, trihexyl aluminum, and trioctyl aluminum; and an aluminoxane such as methyl aluminoxane, ethyl aluminoxane, and propyl aluminoxane. These organoaluminum compounds can be used singly or in combination of two or more of them. Among these, triethyl aluminum and tributyl aluminum are preferably used.

Examples of the organosilicon compound include compounds having an Si—O—C bond, such as phenyltrimethoxysilane, diphenyldimethoxysilane, di-n-propyldimethoxysilane, di-i-propyldimethoxysilane, di-t-butyldimethoxysilane, dicyclohexyldimethoxysilane, dicyclopentyldimethoxysilane, cyclohexylmethyldimethoxysilane, thexyltrimethoxysilane, t-butyltrimethoxysilane, cyclohexyltrimethoxysilane, tetramethoxysilane, and tetraethoxysilane. These organosilicon compound can be used singly or in combination of two or more of them. Among these, di-i-propyldimethoxysilane, dicyclopentyldimethoxysilane, thexyltrimethoxysilane, and t-butyltrimethoxysilane are preferably used.

A reaction vessel for use in the polymerization can be any conventional apparatuses that has been used in this field of art. Examples thereof include a stirring tank type, a fluidized bed type, a circulation type, etc. Any of a continuous polymerization system, a semi-batchwise polymerization system, or a batchwise polymerization system can be employed with using these polymerization vessels.

The multi-stage polymerization process is described, e.g., in JP-B-36-15284, JP-B-38-14834, JP-A-53-35788, and U.S. Pat. Nos. 4,337,326, 4,576,994, and 4,761,461.

Examples of catalysts that can be used for obtaining the BPP of the present invention include a modified polymerization catalyst obtained by treating a solid catalyst comprising a magnesium compound, a titanium compound, a halogen-containing compound, and an electron-donating compound as essential components, with a titanium compound represented by the formula $TiX_a \cdot Y_b$ (wherein X represents Cl Br, or I; Y represents an electron-donating compound; a represents an integer of 3 or 4; and b represents an integer of 3 or less), and washing the treated solid catalyst with a halogen-containing compound and then with a hydrocarbon.

The $TiX_a$ in the formula given above is known as a compound which readily forms complexes with ordinary electron-donating compounds, as described in, e.g., R. S. P. Coutts, et al., *Advan. Organometal. Chem.*, vol. 9, p. 135 (1970); Chemical Society of Japan, *Dai-4-han Shin Jikken Kagaku Koza 17 Muki Sakutai.Kireto Sakutai* (Lecture on New Experimental Chemistry 17, Inorganic Complexes/Chelate Complexes, 4th edition), Maruzen (1991) p. 35; and H. K. Kakkoen, et al., *J. Organomet. Chem.*, vol. 453, p. 175 (1993).

X represents a halogen atom selected from Cl, Br, and I. Preferred of these is Cl. Symbol a is 3 or 4, preferably 4. Examples of Y generally include oxygen compounds, nitrogen compounds, phosphorus compounds, and sulfur compounds. Examples of the oxygen compounds include alcohols, ethers, esters, acid halides, and acid anhydrides. These electron-donating compounds may be used alone or in combination of two or more thereof. Of these electron-donating compounds, esters are preferred, with phthalic esters being especially preferred. Symbol b attached to Y is preferably from 1 to 3 when a is 3, and is preferably 1 or 2 when a is 4. Especially preferred is the case in which a is 4 and b is 1.

The above-mentioned improved (modified) polymerization catalyst is preferably subjected to preliminary polymerization with a small amount of a monomer before used for polymerization. As the method for preliminary polymerization, any conventional methods can be employed. In the case where slurry polymerization is employed for preliminary polymerization, the above-described solvents for the polymerization can be employed in the preliminary polymerization. The temperature for the preliminary polymerization is not particularly limited, and is generally from −30 to 110° C., preferably from −20° to 90° C., more preferably from −10° to 80° C. The amount of monomer to be subjected to the preliminary polymerization is generally about from 0.1 to 1,000 g, preferably about from 0.1 to 500 g, per 1 g of the modified polymerization catalyst. The preliminary polymerization is generally conducted in the presence of the organoaluminum compound and organosilicon compound to be used in the polymerization. The concentration of the modified polymerization catalyst is generally about from 0.01 to 500 mmol, preferably about from 0.05 to 100 mmol, in terms of titanium atom, per 1 litter of the solvent. The amount of the organoaluminum compound is generally about from 0.1 to 100 mol, preferably about from 0.5 to 50 mol, per mole of titanium atom contained in the modified polymerization catalyst. The amount of the organosilicon compound is generally about from 0.1 to 100 mol, preferably about from 0.5 to 40 mol, per mole of titanium atom contained in the modified polymerization catalyst.

Examples of the monomer used in the preliminary polymerization include ethylene or α-olefins such as propylene and 1-butene. Hydrogen as a molecular weight controlling agent can also be used.

Incorporation of a nucleating agent into the BPP of this invention enhances the rigidity, heat resistance, and impact strength of the copolymer. The nucleating agent may be any of various substances which are added to crystalline synthetic resins and have the effect of serving as nuclei to promote the growth of crystals. Examples thereof include metal salts of carboxylic acids, dibenzylidenesorbitol derivatives, metal phosphates, and inorganic fillers such as talc and calcium carbonate. These nucleating agents may be used alone or in combination of two or more thereof. Preferred examples of the nucleating agent include 1,3,2,4-dibenzylidenesorbitol, 1,3,2,4-di-(p-methylbenzylidene) sorbitol, aluminum hydorxydi-p-t-butylbenzoate, polyvilylcyclohexane, polyvinylcyclopentane, sodium 2,2-methylenebis-(4,6-di-t-butylphenyl)phosphate, and talc.

The addition amounts of these nucleating agents are as follows. The nucleating agents other than inorganic fillers are added in an amount of generally from 0.05 to 0.5% by weight, preferably from 0.08 to 0.4% by weight, more preferably from 0.1 to 0.35% by weight. The inorganic fillers including talc are added in an amount of generally from 5 to 30% by weight, preferably from 7 to 28% by weight, more preferably from 9 to 25% by weight.

The incorporation of such a nucleating agent is accomplished by mixing the ingredients by a known mixing means, e.g., a ribbon blender, a tumbler, or a Henschel mixer, and melt-kneading the mixture with a kneader, mixing rolls, a Banbury mixer, an extruder, or the like. The temperature for melt-kneading is generally from 170° to 280° C., preferably from 190° to 260° C. The composition obtained may be molded into a film, sheet, tube, bottle, or another form by the known melt molding or compression molding method. The molding thus obtained may be used either alone or as a laminate with other materials.

Examples of laminating methods include a dry laminating molding method, an extrusion laminating method, a co-extrusion method, a co-injection molding method, and a co-extrusion pipe molding method. In the dry laminating molding method, the composition is laminated with a substrate, such as paper, an aluminum foil, and other thermoplastic resin sheets, through an adhesive. Examples of the adhesive include polyurethane adhesives, polyester adhesives, polyacryl adhesives, and isocyanate adhesives, which are used after dissolving in a solvent such as toluene, ethyl acetate, and hexane. In the extrusion laminating method, the composition is pressed to the above substrate under heating, and examples thereof include a single extrusion coating method, a tandem extrusion coating method, and a co-extrusion coating method. In the co-extrusion method, two or more kinds of molten resins are simultaneously extruded though the same die to obtain a laminated film. The co-injection molding method and the co-extrusion pipe molding method are involved in the co-extrusion method, in which co-extrusion is conducted by using an injection molding apparatus or a pipe molding apparatus.

The above-mentioned laminating methods are described, e.g., in M. Bakker, ed., *The Wiley Encyclopedia of Packaging Technology*, John Wiley & Sons, Inc., New York (1986); C. J. Benning, *Plastics Films for Packaging*, Technomic Publishing Co., Inc., Lancaster Pa. (1983); and J. H. Briston and Dr. L. L. Katan; *Plastics Films* (Third Edition), Longman Scientific & Technical (1989).

The laminate thus obtained may be further molded into a desired shape through re-heating and stretching by vacuum forming, air-pressure forming, blow molding with stretching, or a similar molding technique.

In the BPP of the present invention, additives ordinarily employed in this field of art can be added in an amount that does not impair the effect of the present invention. Examples thereof include an antioxidant, an ultraviolet absorbent, an antistatic agent, a lubricant, an antiblocking agent, an anti-fogging agent, a coloring agent, a plasticizer, a flexibilizer, and a filler.

Examples of the antioxidant include 2,5-di-t-butylhydroquinone, 2,6-di-t-butyl-p-cresol, 4,4'-thiobis(6-t-butylphenol), 2,2-methylene-bis(4-methyl-6-t-butylphenol), octadecyl-3-(3'5'-di-t-butyl-1'-hydroxyphenyl)propionate, and 4,4'-thiobis(6-butylphenol). Examples of the ultraviolet absorbent include ethyl-2-cyano-3,3-diphenylacrylate, 2-(2'-hydroxy-5-methylphenyl)-benzotriazol, and 2-hydroxy-4-octoxybenzophenone. Examples of the antistatic agent include pentaerythritol monostearate, sorbitan monoparmitate, oleic sulfate, polyethylene oxide, and carbon wax. Examples of the lubricant include ethylenebisstearoamide and butyl stearate. Examples of the coloring agent include carbon black, phthalocyanine, quinacridone, indolin, azo pigments, titanium oxide, and red oxide. Examples of the plasticizer include dimethyl phthalate, diethyl phthalate, wax, liquid paraffin, and phosphoric esters. Examples of the filler include glass fibers, asbestos, mica, wollastonite, calcium silicate, aluminum silicate, and calcium carbonate.

These additives other than the plasticizer and the filler can generally be added in an amount of from 0.01 to 1% by weight.

The present invention will be explained below in more detail by reference to Examples.

The methods used for measuring or determining various properties are shown below.

MFR

Measurement was made with a melt indexer manufactured by Takara K. K., Japan in accordance with JIS K7210, Table 1, Conditions 14.

Ethylene Content

Ethylene content was determined by the $^{13}$C-NMR spectrometry described in C. J. Carman et al., *Macromolecules*, vol. 10, p. 537 (1977).

Flexural Modulus

Measurement was made in accordance with JIS K7203.

Izod Impact Strength

Notched Izod impact strength was measured in accordance with JIS K7110.

Falling Weight Impact Strength

A falling weight test was conducted at −20° C. in accordance with ASTM D3029-78. Weight loads were changed 100 g by 100 g, and the load which resulted in the breakage of 50% of twenty test pieces was determined.

Deflection Temperature under Load

Measurement was made under a load of 4.6 kg in accordance with JIS K7207 Method B.

Rockwell Hardness

Measurement was made with scale R in accordance with JIS K7202.

Surface Gloss

Measurement was made with gloss meter Type VG-1D, manufactured by Nippon Denshoku Kogyo K. K., Japan, in accordance with JIS K7205.

PRODUCTION EXAMPLE 1

BPP according to the first aspect of the present invention were produced.

(a) Preparation of Solid Catalyst

Into a liquid mixture consisting of 100 g of absolute ethanol, 500 ml of a vaseline oil (CP15N) manufactured by Idemitsu Kosan Co., Ltd., Japan, and 500 ml of a silicone oil (KF96) manufactured by Shin-Etsu Silicone Co., Ltd., Japan was completely dissolved 56.8 g of anhydrous magnesium chloride at 120° C. in a nitrogen atmosphere. This mixture was agitated with TK Homomixer, manufactured by Tokushu Kika Kogyo Co., Ltd., Japan, at 120° C. and 3,000 rpm for 3 minutes. The mixture was then transferred to 2 liters of absolute heptane with agitation and cooling at 0° C. or a lower temperature. As a result, a white solid was obtained, which was sufficiently washed with absolute heptane and then vacuum-dried at room temperature.

Thirty grams of the thus-obtained white solid was suspended in 200 ml of absolute heptane, and 500 ml of titanium tetrachloride was added thereto dropwise over a period of 1 hour with stirring at 0° C. The resulting mixture was gradually heated and, at the time when the temperature of the mixture had reached 40° C., 4.96 g of diisobutyl phthalate was added. This mixture was heated to 100° C. over a period of about 1 hour. The reactants were reacted at 100° C. for 2 hours, and the hot reaction mixture was then filtered to obtain a solid matter. To this solid matter was added 500 ml of titanium tetrachloride. The reactants were reacted at 120° C. for 1 hour with stirring, and the hot reaction mixture was then filtered to obtain a solid matter. This solid matter was washed with 1 liter of 60° C. hexane 7 times and then with 1 liter of room-temperature hexane 3 times.

(b) Preparation of $TiCl_4(C_6H_4(COO\text{-}i\text{-}C_4H_9)_2)$

To a solution of 19 g of titanium tetrachloride in 1 liter of hexane was added dropwise 27.8 g of diisobutyl phthalate at 0° C. over a period of about 30 minutes. After completion of the addition, the mixture was heated to 40° C. to react the reactants for 30 minutes. Thereafter, the resulting solid matter was taken out and washed with 500 ml of hexane 5 times to obtain the intended substance.

(c) Preparation of Modified Polymerization Catalyst Component

Twenty grams of the solid catalyst obtained in (a) above was suspended in 300 ml of toluene. This suspension was treated at 25° C. for 1 hour with 5.2 g of the $TiCl_4(C_6H_4(COO\text{-}i\text{-}C_4H_9)_2)$ obtained in (b) above to fix the solid catalyst to the titanium compound. After completion of the fixation, the mixture was heated and the hot mixture was filtered to obtain the solid matter. This solid matter was suspended in a mixture of 300 ml of toluene and 10 ml of titanium tetrachloride, and the resulting mixture was stirred at 90° C. for 1 hour to wash the solid matter. The hot mixture was filtered to obtain the solid reaction product, which was then washed with 500 ml of 90° C. toluene 5 times and with 500 ml of room-temperature hexane 3 times.

Preliminary polymerization

Into an autoclave having a capacity of 3 liters were introduced in a nitrogen atmosphere 500 ml of n-heptane, 2.0 g of triisobutylaluminum, and 200 mg of the modified polymerization catalyst component obtained in (c) above. The contents were stirred for 5 minutes in the temperature range of from 0 to 5° C. Ethylene was then fed to the autoclave in such an amount that 10 g of ethylene was polymerized per g of the polymerization catalyst component, and prepolymerization was conducted for 1 hour in the temperature range of from 0 to 5° C. The prepolymerized catalyst component obtained was washed with 500 ml of n-heptane 3 times, before being used in the main polymerization described below.

Main Polymerization (1) First-step Polymerization:

Into an autoclave having a capacity of 60 liters and equipped with a stirrer were introduced in a nitrogen atmosphere 200 mg of the prepolymerized catalyst prepared by the method described above, 10 g of triisobutylaluminum, and 30 liters of isobutane. The contents were heated to 90° C. Subsequently, hydrogen was introduced into the autoclave to a partial hydrogen pressure of 1.8 kg/cm², and ethylene was then continuously fed so as to maintain a partial ethylene pressure of 5 kg/cm² to conduct polymerization for 1 hour. Thereafter, the gases present in the autoclave were discharged from the system to terminate the polymerization, and the contents were cooled to room temperature. After completion of the reaction, the reaction mixture was sampled.

(2) Second-step Polymerization:

After completion of the first-step reaction, 11.4 g of triethylaluminum and 68.4 g of dicyclopentyldimethoxysilane were introduced into the autoclave. Subsequently, 18 kg of propylene was fed along with hydrogen in an amount of 13,000 ppm by mole of the propylene to perform polymerization at a temperature of 70° C. for 1 hour. The propylene remaining unreacted was then removed to terminate the polymerization.

(3) Third-step Polymerization:

After completion of the second-step reaction, the reaction mixture was heated to 75° C., and an ethylene/propylene mixed gas (40/60 by mole) and hydrogen were fed at rates of 2.2 N.m³/hr and 20 N.l/hr, respectively, to perform copolymerization for 40 minutes. The gases remaining unreacted were then removed to terminate the polymerization. As a result, 8 kg of a propylene-ethylene block copolymer (hereinafter referred to as "BPP 11") was obtained.

The same procedure as the above was carried out, except that the amounts of ethylene and hydrogen introduced for the first-step polymerization, the temperature and time for second-step polymerization, and the amount of ethylene introduced for the third-step polymerization were changed. Thus, four propylene-ethylene block copolymers (hereinafter referred to as "BPP 12" to "BPP 15") were obtained.

Further, the same procedure as for obtaining BPP 11 was carried out, except that 1-butene was further fed for the third-step polymerization. Thus, a propylene-ethylene block copolymer (hereinafter referred to as "BPP 16") was obtained.

The BPP obtained above were examined for MFR, density of polyethylene, and ethylene content (butene content) in the BPP excluding polyethylene. The results obtained are shown in Table 2.

With respect to properties (i) to (iv) described hereinabove with regard to polypropylene blocks obtained in the second-step polymerization, a propylene homopolymer was obtained by performing the prepolymerization using propylene and then carrying out the first-step polymerization under the same conditions as in the second-step propylene polymerization described above, and the properties of this propylene homopolymer were taken as those of the polypropylene blocks.

The results of the determination of these properties are shown in Table 2.

For the purpose of comparison, the following three comparative BPP were used.

Using 6.0 g of AA type titanium trichloride manufactured by Tosoh-Akzo Co., Ltd. and 23.5 g of diethylaluminum chloride as catalyst components, a BPP (hereinafter referred to as "BPP 17") was obtained by a process comprising introducing 18 kg of propylene along with hydrogen in an amount of 8,000 ppm by mole of the propylene, heating the contents to 70° C. to perform propylene polymerization as a first-step reaction, and then conducting copolymerization of ethylene and propylene as a second-step reaction. Further, polymerization of propylene and copolymerization of ethylene and propylene were conducted as the first-step and second-step reactions, respectively, in the same manner as for obtaining BPP 11, except that propylene was used in the prepolymerization. Thus, a BPP (hereinafter referred to as "BPP 18") was obtained. Furthermore, polymerization of propylene, copolymerization of ethylene and propylene, and polymerization of ethylene were conducted as the first-step, second-step, and third-step reactions, respectively, in the same manner as for obtaining BPP 11, except that propylene was used in the prepolymerization. Thus, a BPP (hereinafter referred to as "BPP 19") was obtained.

During the processes for producing the copolymers described above, the polypropylene parts were obtained by sampling at the time of completion of the first-step polymerization. These polypropylene parts were analyzed for XI, IP, N, and $N_f$. The results obtained are shown in Table 2. The $^{13}C$ NMR spectra of polypropylene parts were measured under following conditions to give IP, N and $N_f$ values.

Apparatus: JNM-GSX400, manufactured by JEOL Ltd., Japan

Mode of measurement: proton decoupling method

Pulse width: 8.0 μs

Pulse repetition time: 3.0 s

Number of integrations: 20,000

Solvent 1,2,4-trichlorobenzene/deuterated benzene mixture (75/25 by weight)

Internal circulation: hexamethyldisiloxane

Sample concentration: 300 mg/3.0 ml solvent

Temperature: 120° C.

As nucleating agents were used 1,3,2,4-di(p-methylbenzylidene)sorbitol (hereinafter referred to as "nucleating agent A") and sodium 2,2-methylenebis(4,6-di-t-butylphenyl) phosphate (hereinafter referred to as "nucleating agent B").

EXAMPLES 1 TO 10 AND COMPARATIVE EXAMPLES 1 TO 5

Each of the BPP shown in Table 3 was mixed with the nucleating agent the kind and amount of which are shown in Table 3, and with 0.05 wt% di-t-butyl-p-cresol, 0.10 wt% pentaerythrityl tetrakis(3-(3,5-di-t-butyl-4-hydroxyphenyl) propionate), and 0.10 wt% calcium stearate as stabilizers. The ingredients were mixed by means of a supermixer (Type SMV20) manufactured by Kawada Seisakusho K. K., Japan, and each mixture was pelleted with a twin-screw extruder (Type AS30) manufactured by Nakatani Kikai K. K., Japan. Each pelleted resin composition obtained was formed into test pieces using an injection molding machine (IS-170FII) manufactured by Toshiba Machine Co., Ltd., Japan at a temperature of 220° C. and an in-mold cooling temperature of 50° C. The test pieces obtained were allowed to stand for 2 days in a thermostatic chamber having a relative humidity of 50% and a temperature of 23° C., before being examined for flexural modulus, Izod impact strength (notched), falling weight impact strength, deflection temperature under load, Rockwell hardness, and surface gloss. The results obtained are shown in Table 3.

TABLE 2

| Kind of BPP | MFR (g/10 min) | Density of poly-ethylene (g/cm³) | Content of poly-ethylene (wt %) | Ethylene content in BPP extruding poly-ethylene (wt %) | Content of copolymer rubber (wt %) | α-Olefin content in copolymer rubber (w %) | Matrix-phase polypropylene | | | |
|---|---|---|---|---|---|---|---|---|---|---|
| | | | | | | | XI (wt %) | IP (%) | N (−) | proportion of fractions $N_f \geq 800$ (wt %) |
| (Invention) | | | | | | | | | | |
| BPP 11 | 10.1 | 0.953 | 5.6 | 9.9 | 20.1 | 49.5 | 99.5 | 99.5 | 802 | 62 |
| BPP 12 | 13.4 | 0.956 | 1.3 | 9.5 | 19.8 | 48.2 | 99.5 | 99.5 | 824 | 71 |
| BPP 13 | 13.2 | 0.955 | 10.1 | 8.7 | 16.6 | 52.4 | 99.4 | 99.5 | 831 | 76 |
| BPP 14 | 24.2 | 0.950 | 4.1 | 8.4 | 16.7 | 50.4 | 99.5 | 99.4 | 851 | 81 |
| BPP 15 | 18.2 | 0.942 | 2.4 | 10.6 | 20.9 | 55.1 | 99.5 | 99.4 | 811 | 68 |
| BPP 16 | 11.6 | 0.949 | 1.8 | 11.3 (butene 1.6) | 21.7 | 52.1 | 99.5 | 99.5 | 761 | 56 |
| (Comparison) | | | | | | | | | | |
| BPP 17 | 18.2 | — | — | 9.8 | 19.0 | 51.6 | 98.4 | 97.5 | 184 | ≦1 |
| BPP 18 | 10.3 | — | — | 11.6 | 21.6 | 53.8 | 99.5 | 99.5 | 792 | 59 |
| BPP 19 | 10.4 | 0.951 | 5.1 | 9.7 | 19.3 | 50.2 | 99.4 | 99.5 | 783 | 53 |

TABLE 3

| | Kind of BPP | Nucleating agent Kind | Nucleating agent Amount (wt %) | Flexural modulus (kg/cm²) | Izod impact strength 23° C. (kg·cm/cm) | Izod impact strength −30° C. (kg·cm/cm) | Falling weight impact strength −20° C. (kg·cm) | Deflection temperature under load (°C.) | Rockwell hardness (Scale R) | Surface gloss (%) |
|---|---|---|---|---|---|---|---|---|---|---|
| Example 1 | BPP 11 | — | 0 | 14,900 | 7.5 | 4.9 | 243 | 130 | 95 | 60 |
| Example 2 | BPP 12 | — | 0 | 15,100 | 7.4 | 4.8 | 248 | 130 | 96 | 61 |
| Example 3 | BPP 13 | — | 0 | 16,600 | 6.7 | 4.0 | 237 | 131 | 79 | 62 |
| Example 4 | BPP 14 | — | 0 | 16,200 | 6.8 | 4.3 | 241 | 135 | 98 | 63 |
| Example 5 | BPP 15 | — | 0 | 15,400 | 7.1 | 4.4 | 252 | 131 | 95 | 63 |
| Example 6 | BPP 16 | — | 0 | 15,200 | 7.5 | 5.0 | 254 | 130 | 96 | 61 |
| Example 7 | BPP 11 | B | 0.3 | 16,800 | 7.5 | 4.8 | 243 | 136 | 100 | 66 |
| Example 8 | BPP 14 | B | 0.3 | 17,900 | 6.7 | 4.2 | 236 | 139 | 102 | 67 |
| Example 9 | BPP 14 | A | 0.3 | 17,500 | 6.7 | 4.2 | 235 | 138 | 101 | 66 |
| Example 10 | BPP 15 | B | 0.3 | 17,300 | 7.0 | 4.4 | 243 | 138 | 101 | 68 |
| Comparative Example 1 | BPP 17 | — | 0 | 11,600 | 5.3 | 3.1 | 165 | 110 | 90 | 51 |
| Comparative Example 2 | BPP 18 | — | 0 | 12,300 | 5.8 | 3.6 | 174 | 115 | 92 | 54 |
| Comparative Example 3 | BPP 19 | — | 0 | 14,100 | 6.3 | 3.7 | 193 | 124 | 92 | 57 |
| Comparative Example 4 | BPP 19 | A | 0.3 | 15,600 | 7.1 | 4.4 | 215 | 132 | 96 | 63 |
| Comparative Example 5 | BPP 19 | B | 0.3 | 15,700 | 7.2 | 4.6 | 221 | 133 | 97 | 63 |

PRODUCTION EXAMPLE 2

BPP according to the second aspect of the present invention were produced in the same manner as in Production Example 1.

(1) First-step Polymerization:

Into an autoclave having a capacity of 60 liters and equipped with a stirrer were introduced in a nitrogen atmosphere 2 g of a prepolymerized catalyst prepared by the same method as in Production Example 1, 11.4 g of triethylaluminum, and 6.84 g of dicyclopentyldimethoxysilane. Subsequently, 18 kg of propylene was fed to the autoclave along with hydrogen in an amount of 13,000 ppm by mole of the propylene to conduct polymerization at a temperature of 70° C. for 1 hour. The propylene remaining unreacted was then removed to terminate the polymerization. After completion of the reaction, the reaction product was sampled.

(2) Second-step Polymerization:

After completion of the first-step reaction, the reaction mixture was heated to 75° C., and an ethylene/propylene mixed gas (40/60 by mole) and hydrogen were fed at rates of 2.2 N.m³/hr and 20 N.l/hr, respectively, to perform copolymerization for 40 minutes. The gases remaining unreacted were then removed to terminate the polymerization.

(3) Third-step Polymerization:

After completion of the second-step polymerization, 10 g of triisobutylaluminum and 30 liters of isobutane were introduced into the autoclave, and the contents were heated to 90° C. Subsequently, hydrogen was introduced to a partial hydrogen pressure of 2 kg/cm², and ethylene was then continuously fed so as to maintain a partial ethylene pressure of 5 kg/cm² to conduct polymerization for 1 hour. As a result, 8 kg of a propylene-ethylene block copolymer (hereinafter referred to as "BPP 21") was obtained.

The same procedure as the above was carried out, except that the temperature and time for the first-step polymerization, the amount of ethylene fed for the second-step polymerization, and the amounts of ethylene and hydrogen introduced for the third-step polymerization were changed. Thus, four propylene-ethylene block copolymers (hereinafter referred to as "BPP 22" to "BPP 25") were obtained.

Further, the same procedure as for obtaining BPP 21 was carried out, except that 1-butene was further fed for the second-step polymerization. Thus, a propylene-ethylene block copolymer (hereinafter referred to as "BPP 26") was obtained.

For the purpose of comparison, the following three comparative BPP were used.

Using 6.0 g of AA type titanium trichloride manufactured by Tosoh-Akzo Co., Ltd. and 23.5 g of diethylaluminum chloride as catalyst components, a BPP (hereinafter referred to as "BPP 27") was obtained by a process comprising introducing 18 kg of propylene along with hydrogen in an amount of 8,000 ppm by mole of the propylene, heating the contents to 70° C. to perform propylene polymerization as a first-step reaction, and then conducting copolymerization of ethylene and propylene as a second-step reaction. Further, the same procedure as for obtaining BPP 21 was carried out, except that the same catalyst as used for producing BPP 27 was employed. Thus, a BPP (hereinafter referred to as "BPP 28") was obtained. Furthermore, the same procedure as for obtaining BPP 21 was carried out, except that the modified polymerization catalyst was replaced with the solid catalyst obtained in (a) of Production Example 1. Thus, a BPP (hereinafter referred to as "BPP 29") was obtained.

The BPP obtained above were examined for MFR, density of polyethylene, and ethylene content (butene content) in the BPP excluding polyethylene. The results obtained are shown in Table 4.

The polypropylene parts obtained by sampling at the time of completion of the first-step polymerization were analyzed for XI, IP, N, and $N_f$ by the same methods as in Production Example 1. The results obtained are shown in Table 4.

TABLE 4

| Kind of BPP | MFR (g/10 min) | Density of poly-ethylene (g/cm³) | Content of poly-ethylene (wt %) | Ethylene content in BPP extruding poly-ethylene (wt %) | Content of copolymer rubber (wt %) | α-Olefin content in copolymer rubber (w %) | Matrix-phase polypropylene | | | proportion of fractions $N_f \geq 800$ (wt %) |
|---|---|---|---|---|---|---|---|---|---|---|
| | | | | | | | XI (wt %) | IP (%) | N (−) | |
| (Invention) | | | | | | | | | | |
| BPP 21 | 10.4 | 0.953 | 5.1 | 9.5 | 18.9 | 50.2 | 99.4 | 99.5 | 783 | 53 |
| BPP 22 | 12.6 | 0.951 | 2.3 | 9.8 | 19.7 | 49.6 | 99.5 | 99.5 | 838 | 62 |
| BPP 23 | 13.2 | 0.952 | 8.6 | 10.2 | 19.8 | 51.6 | 99.5 | 99.5 | 846 | 72 |
| BPP 24 | 22.8 | 0.950 | 4.3 | 10.8 | 20.3 | 53.1 | 99.5 | 99.4 | 822 | 83 |
| BPP 25 | 17.4 | 0.940 | 2.8 | 12.1 | 21.9 | 55.2 | 99.5 | 99.4 | 785 | 64 |
| BPP 26 | 12.4 | 0.951 | 2.3 | 10.6 (butene 1.4) | 22.2 | 54.1 | 99.5 | 99.5 | 761 | 56 |
| (Comparison) | | | | | | | | | | |
| BPP 27 | 18.2 | — | — | 9.8 | 19.4 | 50.6 | 98.4 | 97.5 | 184 | ≦1 |
| BPP 28 | 11.2 | 0.951 | 4.8 | 11.6 | 12.5 | 52.4 | 98.5 | 97.5 | 219 | ≦1 |
| BPP 29 | 11.5 | 0.950 | 5.3 | 11.2 | 20.1 | 55.6 | 98.8 | 98.7 | 324 | 5 |

EXAMPLES 11 TO 20 AND COMPARATIVE EXAMPLES 6 TO 10

Test pieces were produced in the same manner as in Example 1, except that the BPP shown in Table 5 were used. The test pieces obtained were examined and evaluated in the same manner as in Example 1. The results obtained are shown in Table 5.

TABLE 5

| | Kind of BPP | Nucleating agent | | Flexural modulus (kg/cm²) | Izod impact strength | | Falling weight impact strength | Deflaction temp-erature under load (°C.) | Rockwell hardness (Scale R) | Surface gloss (%) |
|---|---|---|---|---|---|---|---|---|---|---|
| | | Kind | Amount (wt %) | | 23° C. (kg·cm/cm) | −30° C. (kg·cm/cm) | −20° C. (kg·cm) | | | |
| Example 11 | BPP 21 | — | 0 | 15,100 | 7.6 | 4.8 | 246 | 130 | 95 | 61 |
| Example 12 | BPP 22 | — | 0 | 15,400 | 7.4 | 4.8 | 241 | 130 | 95 | 62 |
| Example 13 | BPP 23 | — | 0 | 16,700 | 6.4 | 3.8 | 232 | 132 | 96 | 62 |
| Example 14 | BPP 24 | — | 0 | 16,800 | 6.5 | 4.0 | 238 | 135 | 98 | 63 |
| Example 15 | BPP 25 | — | 0 | 15,500 | 7.2 | 4.4 | 226 | 131 | 95 | 63 |
| Example 16 | BPP 26 | — | 0 | 15,400 | 7.4 | 4.6 | 243 | 130 | 94 | 59 |
| Example 17 | BPP 21 | B | 0.3 | 17,000 | 7.5 | 4.8 | 234 | 136 | 101 | 66 |
| Example 18 | BPP 24 | B | 0.3 | 18,500 | 6.3 | 3.8 | 221 | 140 | 103 | 67 |
| Example 19 | BPP 24 | A | 0.3 | 18,900 | 6.3 | 3.9 | 227 | 140 | 102 | 69 |
| Example 20 | BPP 25 | B | 0.3 | 17,600 | 6.7 | 4.3 | 238 | 137 | 100 | 68 |
| Comparative Example 6 | BPP 27 | — | 0 | 11,600 | 5.3 | 3.1 | 165 | 110 | 90 | 51 |
| Comparative Example 7 | BPP 28 | — | 0 | 12,800 | 4.8 | 2.7 | 151 | 107 | 88 | 55 |
| Comparative Example 8 | BPP 29 | — | 0 | 13,600 | 5.4 | 3.4 | 184 | 120 | 92 | 56 |
| Comparative Example 9 | BPP 27 | A | 0.3 | 13,700 | 5.5 | 3.0 | 167 | 115 | 92 | 54 |
| Comparative Example 10 | BPP 27 | B | 0.3 | 13,900 | 5.5 | 3.0 | 170 | 116 | 93 | 56 |

The resin composition of the present invention is excellent in rigidity, impact resistance, heat resistance, and surface hardness, and is hence useful especially in the fields of automotive parts, electrical or electronic parts, packaging materials, and the like.

While the invention has been described in detail and with reference to specific embodiments thereof, it will be apparent to one skilled in the art that various changes and modifications can be made therein without departing from the spirit and scope thereof.

What is claimed is:

1. A propylene block copolymer comprising a matrix phase and a dispersed phase dispersed in said matrix phase, said matrix phase comprising (a) polypropylene;

said dispersed phase having an average particle diameter of from 0.1 to 5 μm; and said dispersed phase comprising an outer layer comprising (b) propylene-α-olefin copolymer rubber and an inner layer comprising (c) crystalline polyethylene dispersed therein a plurality of particles comprising an outer layer comprising (b') propylene-α-olefin copolymer rubber and an inner layer comprising (a') polypropylene.

2. A propylene block copolymer as claimed in claim 1, wherein said propylene block copolymer comprises (a) polypropylene, (b) propylene-α-olefin copolymer rubber having an α-olefin content of from 20 to 80% by weight, and (c) crystalline polyethylene having a density of 0.92 g/cm$^3$ or more, the amount of said polypropylene (a) being 30 to 94.9% by weight based on the total amount of components (a), (b), and (c), the amount of said propylene-α-olefin copolymer rubber (b) being 5 to 50% by weight based on the total amount of components (a), (b), and (c), the amount of said polyethylene (c) being 0.1 to 20% by weight based on the total amount of components (a), (b), and (c).

3. A propylene block copolymer as claimed in claim 1, wherein said polypropylene (a) constituting said matrix phase has (i) an insoluble amount on xylene extraction at 25° C. of 99.0% by weight or more;

(ii) an isotactic pentad fraction of 98.0% or more;

(iii) an isotactic average chain length of 500 or more; and (iv) a total amount of fractions having an isotactic average chain length of 800 or more obtained in a column chromatographic separation of 10% by weight or more.

4. A propylene block copolymer as claimed in claim 1, wherein said α-olefin is ethylene or 1-butene.

5. A propylene block copolymer resin composition comprising a propylene block copolymer and a nucleating agent in an amount of from 0.05 to 30% by weight based on the amount of said propylene block copolymer, said propylene block copolymer comprising a matrix phase and a dispersed phase dispersed in said matrix phase, said matrix phase comprising (a) polypropylene;

said dispersed phase having an average particle diameter of from 0.1 to 5 μm; and said dispersed phase comprising an outer layer comprising (b) propylene-α-olefin copolymer rubber and an inner layer comprising(c) crystalline polyethylene dispersed therein a plurality of particles comprising an outer layer comprising (b') propylene-α-olefin copolymer rubber and an inner layer comprising (a') polypropylene.

* * * * *

UNITED STATES PATENT AND TRADEMARK OFFICE
CERTIFICATE OF CORRECTION

PATENT NO. : 5,703,172
DATED : Dec. 30, 1997
INVENTOR(S) : Kazuyuki Watanabe; Hisayoshi Yanagihara; Shimako Matsumoto It is certified that error appears in the above-indentified patent and that said Letters Patent is hereby corrected as shown below:

On the title page: Item [56] Reference Cited:

FOREIGN PATENT DOCUMENTS 50-142652  11/1975  Japan
52-98045   8/1977   Japan
53-88049   8/1978   Japan
55-66939   5/1980   Japan Signed and Sealed this Twenty-first Day of July, 1998

Attest:

BRUCE LEHMAN

*Attesting Officer*     *Commissioner of Patents and Trademarks*